United States Patent
Rothberg et al.

(10) Patent No.: US 6,965,966 B1
(45) Date of Patent: Nov. 15, 2005

(54) DISK DRIVE PRE-COMPUTING SEEK PARAMETERS FOR A CONTINUATION TRACK AND A NEXT COMMAND TO FACILITATE CONTINUING A READ-AHEAD OR ABORTING THE READ-AHEAD

(75) Inventors: Michael S. Rothberg, Foothill Ranch, CA (US); Jonathan V. Nguyen, Laguna Niguel, CA (US); Gregory B. Thelin, Garden Grove, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 511 days.

(21) Appl. No.: 10/286,682

(22) Filed: Oct. 31, 2002

(51) Int. Cl.[7] .............................................. G06F 12/00
(52) U.S. Cl. ......................... 711/112; 711/137; 710/6; 710/39; 710/45; 360/78.14
(58) Field of Search ....................... 711/112, 113, 167, 711/137; 710/6, 39, 45, 58; 360/78.14

(56) References Cited

U.S. PATENT DOCUMENTS

| 5,268,804 | A | * | 12/1993 | Wallis | 360/78.04 |
| 5,991,825 | A | * | 11/1999 | Ng | 710/6 |
| 6,339,811 | B1 | | 1/2002 | Gaertner et al. | |
| 6,658,535 | B1 | * | 12/2003 | Megiddo et al. | 711/137 |
| 2003/0041214 | A1 | * | 2/2003 | Hirao et al. | 711/137 |
| 2003/0105919 | A1 | * | 6/2003 | Olds et al. | 711/113 |
| 2003/0123183 | A1 | * | 7/2003 | Arakawa et al. | 360/78.07 |

OTHER PUBLICATIONS

"Optimization of Look-Ahead Abort Timing," IBM Technical Disclosure Bulletin, vol. 37, Issue 2B, pp. 663-664, 1994.*

* cited by examiner

*Primary Examiner*—Matthew D. Anderson
*Assistant Examiner*—Shane Thomas
(74) *Attorney, Agent, or Firm*—Milad G. Shara, Esq.; Howard H. Sheerin, Esq.

(57) ABSTRACT

A disk drive is disclosed which pre-computes first seek parameters to seek to a continuation track storing read-ahead data, and second seek parameters to seek to a target track of a next command. An abort window is also computed for aborting a read-ahead operation early in order to seek to the target track of the next command. If the head enters the abort window, the disk drive is programmed with the second seek parameters to seek to the target track of the next command. If the read-ahead operation requires a seek to the continuation track prior to the head entering the abort window, the disk drive is programmed with the first seek parameters to seek to the continuation track.

12 Claims, 5 Drawing Sheets

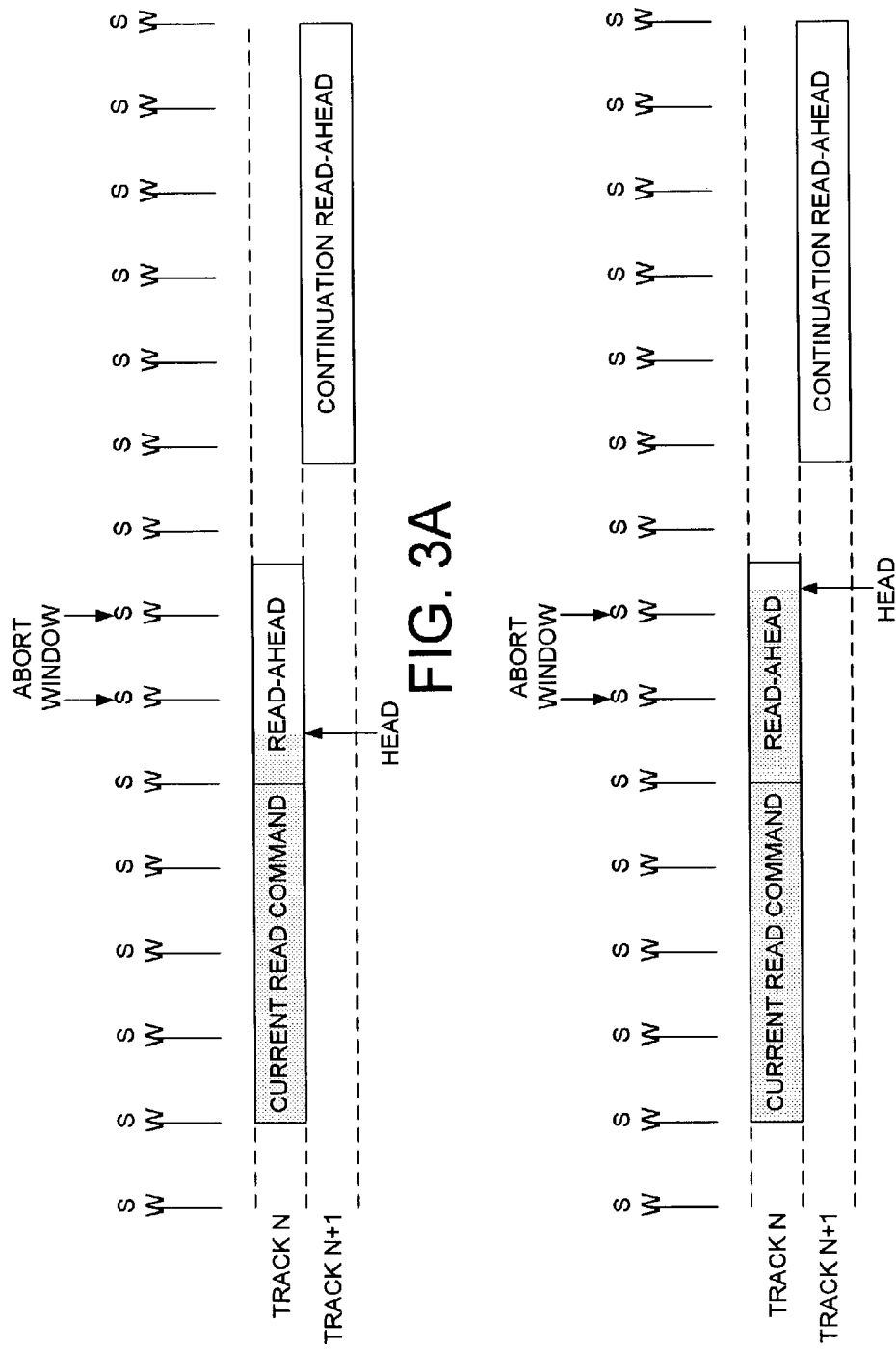

DISK DRIVE PRE-COMPUTING SEEK PARAMETERS FOR A CONTINUATION TRACK AND A NEXT COMMAND TO FACILITATE CONTINUING A READ-AHEAD OR ABORTING THE READ-AHEAD

CROSS REFERENCE TO RELATED APPLICATIONS AND PATENTS

This application is related to co-pending U.S. Patent Application Ser. No. 10/286,127 entitled "DISK DRIVE EMPLOYING A MULTI-PHASE ROTATIONAL POSITION OPTIMIZATION (RPO) ALGORITHM" filed on Oct. 31, 2002, the disclosure of which is incorporated herein by reference.

BACKGROUND OF THE INVENTION

1. Field of the Invention

The present invention relates to disk drives for computer systems. More particularly, the present invention relates to a disk drive pre-computing seek parameters for a continuation track and a next command to facilitate continuing a read-ahead or aborting the read-ahead.

2. Description of the Prior Art

It is known to abort the read-ahead operation of a current read command in order to enhance a rotational position optimization (RPO) algorithm. The RPO algorithm will compute an "abort window" within which the read-ahead operation should be aborted in order for the head to reach the target track ahead of the target sector for the next command. If the abort window is missed, the seek for the next command is executed at the end of the read-ahead operation without gaining any improvement from the RPO algorithm.

It is desirable to seek the head to the target track for the new command as soon as possible after the head enters the abort window so that the head can reach the target track in time to perform a pre-read operation for the next command. Any delay in reaching the target track of the next command will effectively truncate the pre-read operation. In addition, a read-ahead for a current read command may extend through to a continuation track requiring a seek to the continuation track. However, the latency in pre-computing whether the head will reach the track boundary during the read command may delay detecting the abort window or cause it to be missed altogether thereby reducing the benefit of the RPO algorithm.

There is, therefore, a need to abort read-ahead operations soon after the head enters the abort window in order to maximize the pre-read operation for the next command while allowing a read-ahead operation of the current command to extend through to a continuation track.

SUMMARY OF THE INVENTION

The present invention may be regarded as a disk drive comprising a disk having a plurality of tracks, each track comprising a plurality of blocks and a plurality of embedded servo sectors recorded at a predetermined interval. The disk drive further comprises a head actuated radially over the disk and a disk controller. A first command is executed by reading read data from a selected one of the tracks and executing a read-ahead operation by reading read-ahead data from the disk following the read data. First seek parameters are pre-computed to seek the head to a continuation track storing at least part of the read-ahead data. An abort window is computed in response to a second command for aborting the read-ahead operation of the first command. Second seek parameters are pre-computed to seek the head to a target track of the second command. The embedded servo sectors are processed to detect when the head enters the abort window. If the head enters the abort window, the disk drive is programmed with the second seek parameters to seek the head to the target track of the second command. If the read-ahead operation requires a seek to the continuation track prior to the head entering the abort window, the disk drive is programmed with the first seek parameters to seek the head to the continuation track.

In one embodiment, the disk controller executes a multi-tasking operating system. The first command is executed during a first task having a first priority level and the abort window is computed during a second task having a second priority level, wherein the first priority level is higher than the second priority level. The abort window is transferred from the second task to the first task asynchronously while executing the first command.

In another embodiment, while executing the first command the disk controller executes a rotational position optimization (RPO) algorithm to select the second command out of a plurality of pending commands, and the abort window is computed relative to the second command selected by the RPO algorithm.

In one embodiment, the first and second seek parameters comprise a seek profile. In yet another embodiment, the tracks are banded together to form a plurality of zones, a plurality of read channel parameters are associated with each zone, the first seek parameters comprise read channel parameters corresponding to the zone comprising the continuation track, and the second seek parameters comprise read channel parameters corresponding to the zone comprising the target track of the second command. In one embodiment, the disk drive further comprises a first semiconductor memory and a second semiconductor memory, wherein the first semiconductor memory is slower than the second semiconductor memory. The disk controller pre-computes the first and second seek parameters by copying the corresponding read channel parameters from the first semiconductor memory to the second semiconductor memory.

The present invention may also be regarded as a method of operating a disk drive. The disk drive comprising a disk having a plurality of tracks, each track comprising a plurality of blocks and a plurality of embedded servo sectors recorded at a predetermined interval, and a head actuated radially over the disk. A first command is received from a host computer, the first command comprising a command size representing a number of blocks of read data to read from the disk. The first command is executed by reading the read data from a selected one of the tracks and executing a read-ahead operation by reading read-ahead data from the disk following the read data. First seek parameters are pre-computed to seek the head to a continuation track storing at least part of the read-ahead data. An abort window is computed in response to a second command received from the host computer, the abort window for aborting the read-ahead operation of the first command. Second seek parameters are pre-computed to seek the head to a target track of the second command. The embedded servo sectors are processed to detect when the head enters the abort window. If the head enters the abort window, the disk drive is programmed with the second seek parameters to seek the head to the target track of the second command. If the read-ahead operation requires a seek to the continuation track prior to the head entering the abort window, the disk drive is programmed with the first seek parameters to seek the head to the continuation track.

BRIEF DESCRIPTION OF THE DRAWINGS

FIG. 3A illustrates an embodiment of the present invention wherein the asynchronous abort window occurs prior to the head reaching the track boundary of the current track during a read-ahead operation.

FIG. 3B illustrates an embodiment of the present invention wherein the head has already passed the asynchronous abort window while reading the current track during the read-ahead operation.

DESCRIPTION OF THE PREFERRED EMBODIMENTS

Figure 1A:
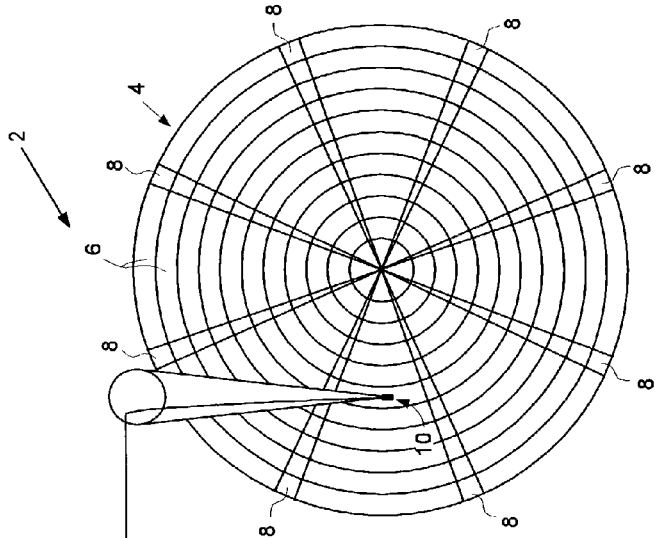
FIGS. 1A–1B show a disk drive according to an embodiment of the present invention wherein seek parameters for a continuation track and a next command are computed and used selectively depending on whether an abort window is encountered before the track boundary of a current track.
Figure 1B:
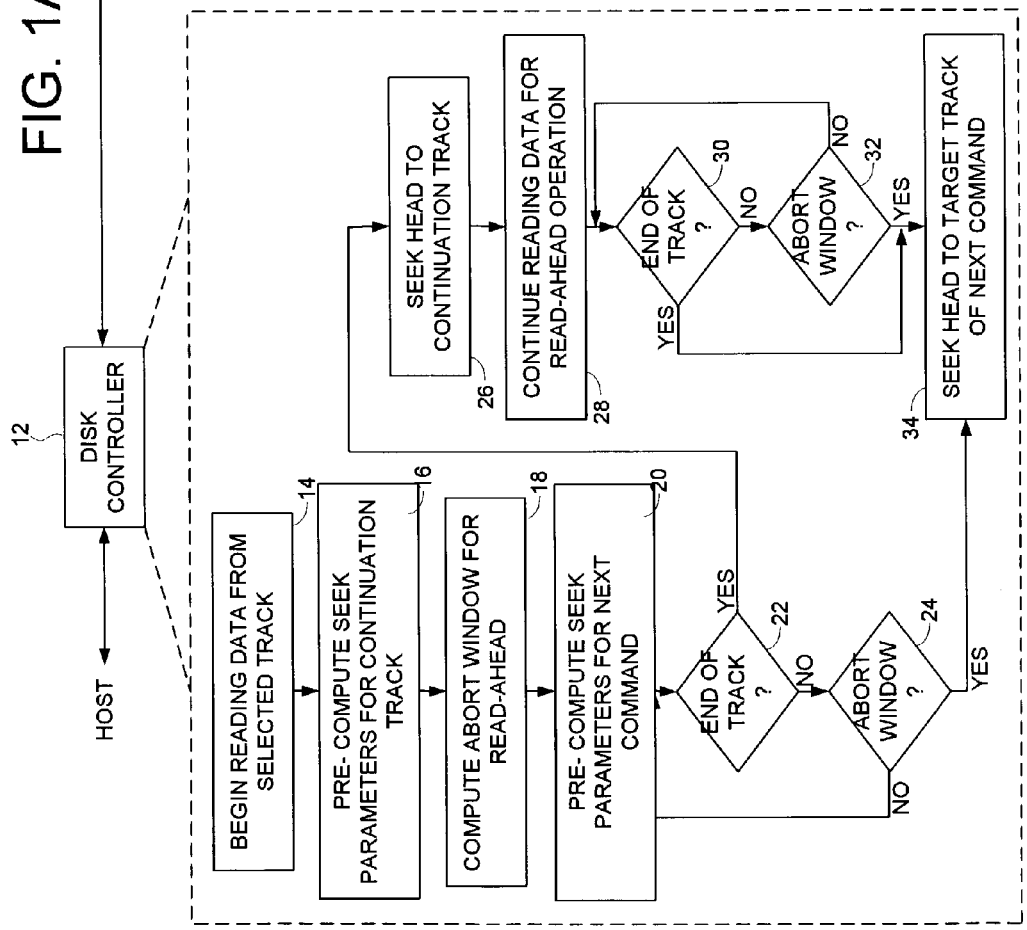

FIG. 1A shows a disk drive 2 according to an embodiment of the present invention comprising a disk 4 having a plurality of tracks 6, each track comprising a plurality of blocks and a plurality of embedded servo sectors 8 recorded at a predetermined interval. The disk drive 2 further comprises a head 10 actuated radially over the disk 4 and a disk controller 12. FIG. 1B shows a flow diagram executed by the disk controller 12 wherein at step 14 a first command is executed by reading read data from a selected one of the tracks 6 and executing a read-ahead operation by reading read-ahead data from the disk 4 following the read data. At step 16, first seek parameters are pre-computed to seek the head 10 to a continuation track storing at least part of the read-ahead data. At step 18, an abort window is computed in response to a second command for aborting the read-ahead operation of the first command. At step 20, second seek parameters are pre-computed to seek the head 10 to a target track of the second command. At step 24 and step 32, the embedded servo sectors 8 are processed to detect when the head 10 enters the abort window. If the head 10 enters the abort window at step 24 or step 32, at step 34 the disk drive 2 is programmed with the second seek parameters to seek the head 10 to the target track of the second command. If at step 22 the read-ahead operation requires a seek to the continuation track prior to the head 10 entering the abort window at step 24, at step 26 the disk drive 2 is programmed with the first seek parameters to seek the head 10 to the continuation track and at step 28 the read-ahead operation continues until at step 30 the read-ahead finishes or at step 32 the head 10 enters the abort window.

Any suitable disk format may be employed in the embodiments of the present invention including a spiral track format. In one embodiment, each embedded servo sector 8 comprises coarse head positioning information (e.g., a track number) processed to position the head 10 over a target track, and fine head positioning information (e.g., servo bursts) processed to maintain the head 10 over a centerline of the target track during read and write operations. The head positioning information derived from the embedded servo sectors 8 enables the disk controller 12 to detect when the head 10 enters the abort window, and in one embodiment described below, to implement a rotational position optimization (RPO) algorithm for selecting the next command to execute out of a plurality of pending commands. The RPO algorithm minimizes the latency (seek latency and rotational latency) in moving the head 10 to the target track of the next command.

In one embodiment, the disk controller 12 executes a multi-tasking operating system. The first command is executed during a first task having a first priority level and the abort window is computed during a second task having a second priority level, wherein the first priority level is higher than the second priority level. The abort window is transferred from the second task to the first task asynchronously while executing the first command.

Figure 2:
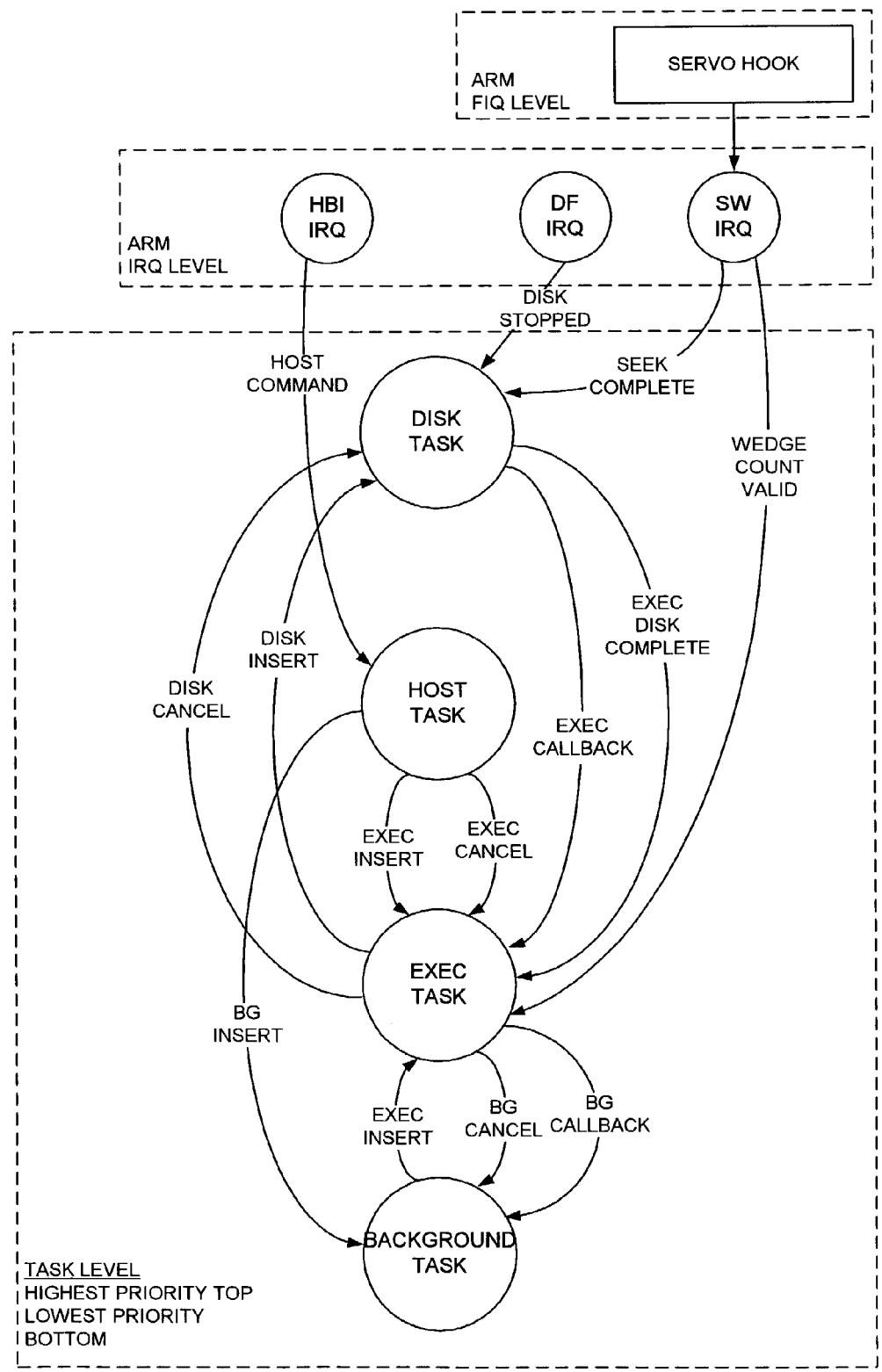
FIG. 2 shows a flow diagram of a multitasking operating system executed by the disk drive according to an embodiment of the present invention wherein the abort window is computed asynchronously by a rotational position optimization (RPO) algorithm after selecting the next command to execute.

FIG. 2 shows a flow diagram of a multitasking operating system executed by the disk controller 12 according to an embodiment of the present invention. In this embodiment, the disk controller 12 executes a DISK TASK, a HOST TASK, an EXEC TASK and a BACKGROUND TASK, wherein the DISK TASK has the highest priority and the BACKGROUND TASK has the lowest priority.

- DISK TASK is responsible mainly for disk formatting operations for read/write commands, such as determining the track format including number and location of defects and configuring the read/write channel circuitry with appropriate parameters. The DISK TASK runs in response to disk formatting hardware (DF IRQ) and servo wedge hardware (SW IRQ) indicating that a requested seek has completed.
- HOST TASK is responsible for receiving commands from the host. It runs in response to commands received from the host bus interface (HBI) hardware.
- EXEC TASK is responsible for implementing the rotational position optimization (RPO) algorithm for selecting the next command to be executed by the DISK TASK. It typically runs after the DISK TASK has emptied a pipeline slot.
- BACKGROUND TASK is responsible for implementing background operations. It typically initiates read/write commands not initiated by the host, for example, while performing diagnostic or calibration procedures.

In the embodiment of FIG. 2, there are a number of event flags associated with each of the tasks:
- HOST COMMAND EVENT set by the HBI interrupt service routine when a new command is received from the host.
- DISK STOPPED EVENT set by the DF interrupt service routing in connection with a data formatting operation for a current command.
- DISK INSERT EVENT set by the EXEC TASK when a next command is inserted into the "next" pipeline slot for the DISK TASK. This signals the DISK TASK to pipeline the next command behind the current command being executed.

EXEC DISK COMPLETE EVENT set by the DISK TASK when it moves the next command from the "next" pipeline slot into the "current" pipeline slot. This signals the EXEC TASK to execute the RPO algorithm to select the next command to execute.

EXEC CALLBACK EVENT set by the DISK TASK after completing the command requested by the EXEC TASK.

EXEC INSERT EVENT set by the HOST TASK and BACKGROUND TASK to execute the RPO algorithm based on desired criteria, for example, flushing write commands to free-up cache resources.

EXEC CANCEL EVENT set by the EXEC TASK to cancel a command sent to the EXEC TASK.

BACKGROUND CALLBACK EVENT set by the EXEC TASK after processing the command requested by the BACKGROUND TASK.

BACKGROUND CANCEL EVENT set by the EXEC TASK to cancel the command requested by the BACKGROUND TASK.

DISK CANCEL EVENT set by the EXEC TASK to cancel the command in the "next" pipeline slot.

SEEK COMPLETE EVENT set by the servo wedge (SW) ISR to signal the DISK TASK that the requested seek operation has been completed.

WEDGE COUNT VALID EVENT set by the servo wedge (SW) ISR to signal the EXEC TASK that the wedge count is valid and that the second phase of the RPO algorithm may commence. See the above referenced co-pending patent application entitle "DISK DRIVE EMPLOYING A MULTI-PHASE ROTATIONAL POSITION OPTIMIZATION (RPO) ALGORITHM".

BACKGROUND INSERT EVENT set by the HOST TASK to start background processing such as diagnostic or calibration procedure.

The EXEC TASK executes an RPO algorithm for selecting a next command to execute out of a plurality of pending commands. The RPO algorithm evaluates the latency involved with moving the head 10 to each of the pending commands (seek latency and rotational latency) and selects the next command which minimizes the latency. If the current command is a read command, the RPO algorithm also computes an abort window for aborting the read-ahead operation of the read command in order for the head 10 to reach the target track for the next command in front of the first target sector. Once the RPO algorithm selects the next command and computes the abort window, both are transferred asynchronously to the DISK TASK while the disk task is still processing the current command.

Because the abort window enters the DISK TASK asynchronously, the DISK TASK cannot determine whether the current read-ahead operation will be aborted before requiring a seek to a continuation track. Therefore the DISK TASK pre-computes the seek parameters for seeking the head 10 to the continuation track while concurrently executing the current command. In this manner the seek parameters are available immediately if the head 10 reaches the track boundary before entering the abort window. When the next command is received from the EXEC TASK, the DISK TASK pre-computes the seek parameters for seeking the head 10 to the target track of the next command. If the DISK TASK detects that the head 10 has entered the abort window, the seek parameters are available immediately to seek the head 10 to the target track of the next command.

FIG. 3A shows the disk controller 12 executing a current read command wherein the head 10 has finished reading the read-data and has begun reading the read-ahead data for the read-ahead operation. The EXEC TASK computes the abort window and transfers it to the DISK TASK prior to the head 10 reaching the abort window or the track boundary. The DISK TASK pre-computes the seek parameters for the next command associated with the abort window, but does not compute whether the track boundary will be encountered before the abort window. In this manner the DISK TASK is ready to initiate the seek to the target track of the next command as soon as the head 10 enters the abort window. Otherwise the latency in computing whether the track boundary will be encountered before the abort window may cause the abort window to be missed altogether.

FIG. 3B shows the disk controller 12 executing a current read command wherein the head 10 has already passed the abort window when the abort window arrives at the DISK TASK. In this case the DISK TASK will initiate the seek to the next command after completing the read-ahead operation (the benefit of the RPO algorithm is lost). When the head 10 reaches the track boundary, the DISK TASK initiates a seek to the continuation track using the pre-computed seek parameters for the continuation track. When the head 10 reaches the end of the continuation track, the DISK TASK initiates a seek to the target track of the next command using the pre-computed seek parameters for the next command.

Figure 3C:
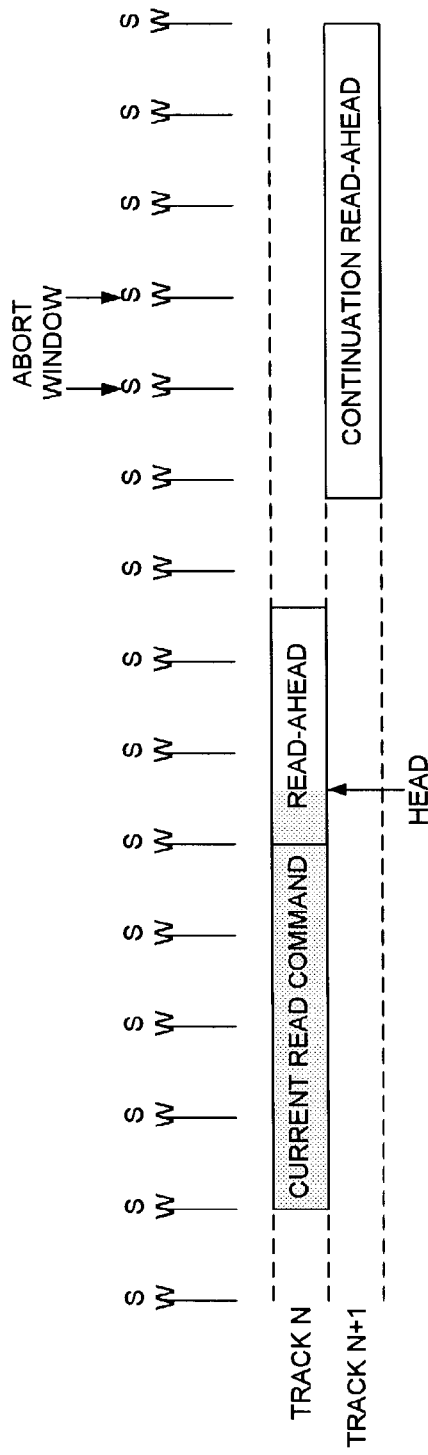
FIG. 3C illustrates an embodiment of the present invention wherein the asynchronous abort window occurs within the continuation track before the head reaches the continuation track.

FIG. 3C shows the disk controller 12 executing a current read command wherein the head 10 is reading read-ahead data from a current track and the abort window occurs on the continuation track. When the head 10 reaches the track boundary, the DISK TASK initiates a seek to the continuation track using the pre-computed seek parameters for the continuation track, and when the head 10 reaches the abort window, the DISK TASK initiates a seek to the target track of the next command using the pre-computed seek parameters for the next command.

Figure 3D:
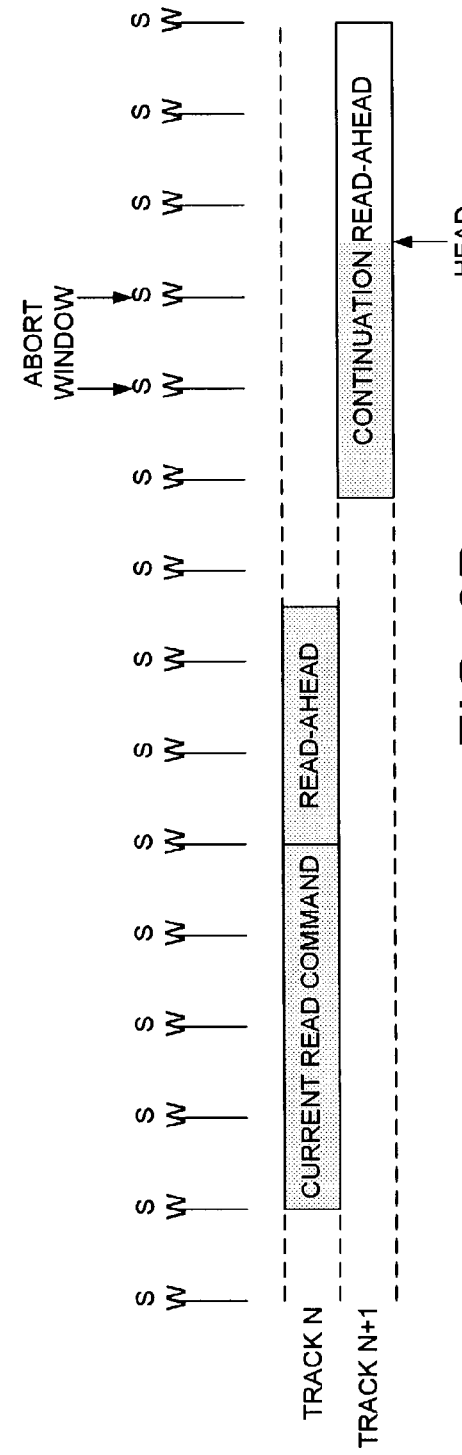
FIG. 3D illustrates an embodiment of the present invention wherein the head has already passed the asynchronous abort window while reading the continuation track during the read-ahead operation.

FIG. 3D shows the disk controller 12 executing a current read command wherein the DISK TASK has already performed a seek to the continuation track and the head 10 has already passed the abort window when the abort window arrives at the DISK TASK. In this case the DISK TASK will initiate the seek to the next command after completing the read-ahead operation (the benefit of the RPO algorithm is lost).

Any suitable seek parameters may be pre-computed by the DISK TASK in the embodiments of the present invention, including a seek profile for controlling the acceleration, constant velocity and deceleration of the head 10 during the seek. In yet another embodiment, the tracks 6 in FIG. 1A are banded together to form a plurality of zones, a plurality of read channel parameters are associated with each zone, the first seek parameters comprise read channel parameters corresponding to the zone comprising the continuation track, and the second seek parameters comprise read channel parameters corresponding to the zone comprising the target track of the second command.

Figure 4:
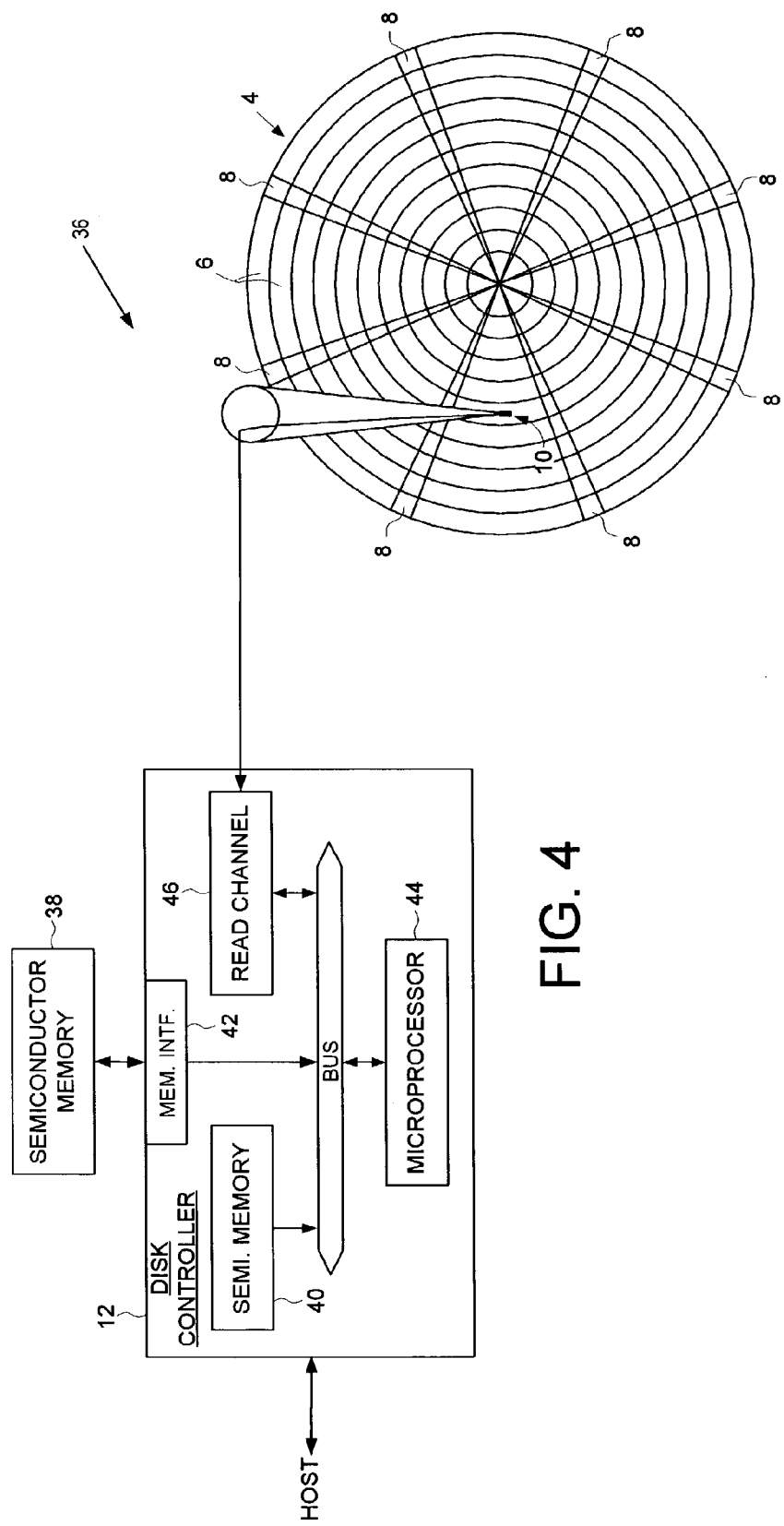
FIG. 4 shows a disk drive according to an embodiment of the present invention wherein read-channel parameters for the seek parameters are copied from a slower semiconductor memory into a faster semiconductor memory.

FIG. 4 shows a disk drive 36 comprises a first semiconductor memory 38 and a second semiconductor memory 40, wherein the first semiconductor memory 38 is slower than the second semiconductor memory 40. The disk controller 12 pre-computes the first and second seek parameters by copying the corresponding read channel parameters from the first semiconductor memory 38 to the second semiconductor memory 40. In the embodiment of FIG. 4, the disk controller 12 is implemented as an integrated circuit comprising the second semiconductor memory 40. For example, in one embodiment the first semiconductor memory 38 is a FLASH memory (parallel or serial) and the second semiconductor memory 40 is a SRAM memory. The disk controller 12 in FIG. 4 comprises a memory interface 42 for interfacing with the first semiconductor memory 38 and a microprocessor 44 for copying the read channel parameters from the first semiconductor memory 38 to the second semiconductor memory 40. When the DISK TASK initiates a seek operation, the microprocessors 44 programs a read channel 46 with the read channel parameters stored in the second semiconductor memory 40 that correspond to the selected seek operation (continuation track or next command).

We claim:

1. A disk drive comprising:
   (a) a disk comprising a plurality of tracks, each track comprising a plurality of blocks and a plurality of embedded servo sectors recorded at a predetermined interval;
   (b) a head actuated radially over the disk; and
   (c) a disk controller for:
      executing a first command by reading read data from a selected one of the tracks and executing a read-ahead operation by reading read-ahead data from the disk following the read data;
      pre-computing first seek parameters to seek the head to a continuation track storing at least part of the read-ahead data;
      computing an abort window in response to a second command for aborting the read-ahead operation of the first command;
      pre-computing second seek parameters to seek the head to a target track of the second command;
      processing the embedded servo sectors to detect when the head enters the abort window;
      if the head enters the abort window, programming the disk drive with the second seek parameters to seek the head to the target track of the second command; and
      if the read-ahead operation requires a seek to the continuation track prior to the head entering the abort window, programming the disk drive with the first seek parameters to seek the head to the continuation track.

2. The disk drive as recited in claim 1, wherein
   (a) the disk controller executes a multi-tasking operating system;
   (b) the disk controller executes the first command during a first task having a first priority level;
   (c) the disk controller computes the abort window during a second task having a second priority level;
   (d) the first priority level is higher than the second priority level; and
   (e) the disk controller transfers the abort window from the second task to the first task asynchronously while executing the first command.

3. The disk drive as recited in claim 2, wherein:
   (a) while executing the first command the disk controller executes a rotational position optimization (RPO) algorithm to select the second command out of a plurality of pending commands; and
   (b) the abort window is computed relative to the second command selected by the RPO algorithm.

4. The disk drive as recited in claim 1, wherein the first and second seek parameters comprise a seek profile.

5. The disk drive as recited in claim 1, wherein:
   (a) the tracks are banded together to form a plurality of zones;
   (b) a plurality of read channel parameters are associated with each zone;
   (c) the first seek parameters comprise read channel parameters corresponding to the zone comprising the continuation track; and
   (d) the second seek parameters comprise read channel parameters corresponding to the zone comprising the target track of the second command.

6. The disk drive as recited in claim 5, wherein:
   (a) the disk drive further comprises a first semiconductor memory and a second semiconductor memory, wherein the first semiconductor memory is slower than the second semiconductor memory; and
   (b) the disk controller pre-computes the first and second seek parameters by copying the corresponding read channel parameters from the first semiconductor memory to the second semiconductor memory.

7. A method of operating a disk drive, the disk drive comprising a disk having a plurality of tracks, each track comprising a plurality of blocks and a plurality of embedded servo sectors recorded at a predetermined interval, and a head actuated radially over the disk, the method comprising the steps of:
   (a) receiving a first command from a host computer, the first command comprising a command size representing a number of blocks of read data to read from the disk;
   (b) executing the first command by reading the read data from a selected one of the tracks and executing a read-ahead operation by reading read-ahead data from the disk following the read data;
   (c) pre-computing first seek parameters to seek the head to a continuation track storing at least part of the read-ahead data;
   (d) receiving a second command from the host computer;
   (e) computing an abort window in response to the second command for aborting the read-ahead operation of the first command;
   (f) pre-computing second seek parameters to seek the head to a target track of the second command;
   (g) processing the embedded servo sectors to detect when the head enters the abort window;
   (h) if the head enters the abort window, programming the disk drive with the second seek parameters to seek the head to the target track of the second command; and
   (i) if the read-ahead operation requires a seek to the continuation track prior to the head entering the abort window, programming the disk drive with the first seek parameters to seek the head to the continuation track.

8. The method as recited in claim 7, further comprising the steps of:
   (a) executing the first command during a first task having a first priority level;
   (b) computing the abort window during a second task having a second priority level, wherein the first priority level is higher than the second priority level; and
   (c) transferring the abort window from the second task to the first task asynchronously while executing the first command.

9. The method as recited in claim 8, further comprising the steps of:
   (a) while executing the first command executing a rotational position optimization (RPO) algorithm to select the second command; and
   (b) computing the abort window relative to the second command selected by the RPO algorithm.

10. The method as recited in claim 7, wherein the first and second seek parameters comprise a seek profile.

11. The method as recited in claim 7, wherein:
(a) the tracks are banded together to form a plurality of zones;
(b) a plurality of read channel parameters are associated with each zone;
(c) the first seek parameters comprise read channel parameters corresponding to the zone comprising the continuation track; and
(d) the second seek parameters comprise read channel parameters corresponding to the zone comprising the target track of the second command.

12. The method as recited in claim 11, wherein:
(a) the disk drive further comprises a first semiconductor memory and a second semiconductor memory, wherein the first semiconductor memory is slower than the second semiconductor memory; and
(b) the steps of pre-computing the first and second seek parameters comprises the step of copying the corresponding read channel parameters from the first semiconductor memory to the second semiconductor memory.

* * * * *